(No Model.)
F. W. URANN.
TOASTER.
No. 410,338. Patented Sept. 3, 1889.
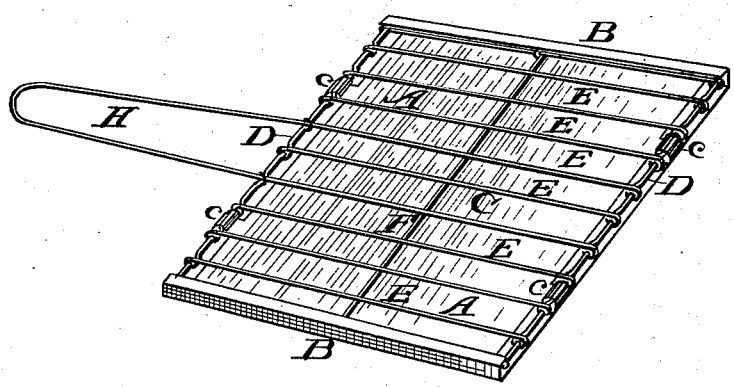
Witness,
Geo. B. Tibbitts
Young Ransom.
Inventor,
Frederick W. Urann
by Geo. W. Tibbitts Atty.

UNITED STATES PATENT OFFICE.

FREDERICK W. URANN, OF CLEVELAND, OHIO.

TOASTER.

SPECIFICATION forming part of Letters Patent No. 410,338, dated September 3, 1889.

Application filed April 28, 1888. Serial No. 272,161. (No model.)

*To all whom it may concern:*

Be it known that I, FREDERICK W. URANN, a citizen of the United States, residing at Cleveland, in the county of Cuyahoga and State of Ohio, have invented certain new and useful Improvements in Toasters, of which the following is a specification.

This invention relates to toasters for toasting bread and similar food over a gasoline or gas burner; and it consists in the peculiar construction and combination of the parts, as hereinafter described, and pointed out in the claims.

In the accompanying drawing the figure is a perspective view of my new toaster.

A is a sheet-metal plate of suitable size and form, having its side edges turned upward and over, forming grooved flanges B B, and its end edges turned and lapped over onto itself to stiffen the edges.

C is the wire frame, consisting of two crimped end wires D D and several cross-wires E E, secured at each of their ends to the end wires at the crimps.

H is a handle formed by the extended portion of two of the cross-wires E.

F is a middle wire or bar lying on the under side of the cross-wires E and fastened at its ends to the side wires. The special purpose of this middle wire will be hereinafter shown. The wire frame C is secured to the plate A by slipping it into the grooves in the flanges B B, and lips $c\ c$ cut in the lapped edges of the ends of the plate bent over and clasping the end wires D D. The bread to be toasted is laid on the wire frame and the toaster placed over the flame of the burner, which is quickly heated and the bread is quickly and perfectly toasted. The plate, when heated, swells upward in the middle and would come in contact with the wires E, on which the bread lies; but by the interposition of the wire F the plate cannot reach the wires E, and thereby the bread is protected from burning.

Having described my invention, I claim—

1. In a toaster, the plate A, having one or more grooved flanges B, and a wire frame D, provided with handle H, constructed and combined substantially as and for the purpose specified.

2. In a toaster, the combination, with plate A, having one or more grooved flanges B, and the frame D, of the cross-bar E, for supporting the frame D above the plate A, as and for the purpose specified.

FREDERICK W. URANN.

Witnesses:
GEO. W. TIBBITTS,
C. C. SHANKLIN.